United States Patent [19]

Nishimura

[11] Patent Number: 5,172,722
[45] Date of Patent: Dec. 22, 1992

[54] STOP VALVE FOR A VACUUM APPARATUS
[75] Inventor: Koichi Nishimura, Tsutsumi, Japan
[73] Assignee: Motoyama Eng. Works, Ltd., Japan
[21] Appl. No.: 758,666
[22] Filed: Sep. 12, 1991
[30] Foreign Application Priority Data Sep. 17, 1990 [JP] Japan ................. 2-96449[U]
Jun. 21, 1991 [JP] Japan ................. 3-47129[U]

[51] Int. Cl.5 ................................... F16K 1/54
[52] U.S. Cl. ..................... 137/599.2; 137/630
[58] Field of Search ............... 137/599.2, 630, 630.14, 137/630.15; 251/356, 358

[56] References Cited

U.S. PATENT DOCUMENTS

| 1,870,293 | 8/1932 | Miller | 137/630.15 |
| 1,882,392 | 10/1932 | Musgrave | 137/630 |
| 3,190,314 | 6/1965 | Visos | 137/630.15 |
| 3,624,753 | 11/1971 | Brumm | 137/630.14 |
| 3,631,894 | 1/1972 | Frantz | 137/630.15 |
| 4,041,980 | 8/1977 | Grotloh | 137/599.2 |
| 4,342,328 | 8/1982 | Matta | 137/630.15 |

FOREIGN PATENT DOCUMENTS 1047810 11/1966 United Kingdom ................. 137/630

Primary Examiner—Robert G. Nilson
Attorney, Agent, or Firm—Robbins, Dalgarn, Berliner & Carson

[57] ABSTRACT

A stop valve for a vacuum apparatus comprises a valve casing having an inlet port and an outlet port, a main valve element housed in the valve casing for selectively opening and closing a flow passageway for causing the inlet port to comunicate with the outlet port, an auxiliary valve element for selectively opening and closing an orifice formed in the main valve element and capable of opening the flow passageway by opening the orifice when the main valve element is closed, a valve shaft for driving the main valve element and the auxiliary element, and a control mechanism for controlling the operation of the valve shaft and opening the main valve element after the auxiliary valve element has been opened.

8 Claims, 7 Drawing Sheets

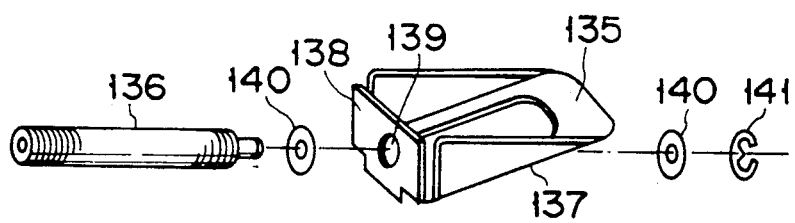
F I G. 6A
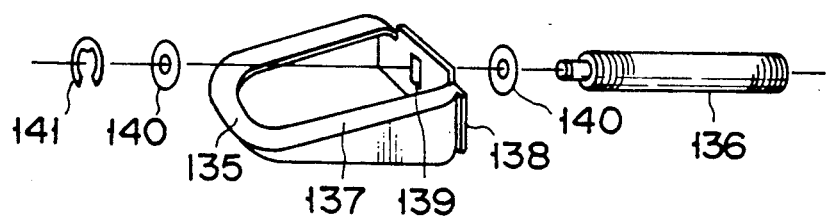
F I G. 6B
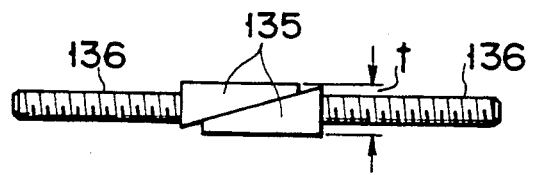
F I G. 7

STOP VALVE FOR A VACUUM APPARATUS

BACKGROUND OF THE INVENTION

1. Field of the Invention

This invention relates to a stop valve used in a vacuum apparatus, and more particularly to a stop valve for a vacuum apparatus, which stop valve has a main valve portion of a large capacity and an auxiliary valve portion of a small capacity both provided in an air exhaust passageway.

2. Description of the Related Art

In a vacuum apparatus used in a manufacturing system of semiconductors and the like, it is necessary to increase the degree of vacuum in a chamber in a short time, and thus it is required that a stop valve provided in an exhaust passageway have a resistance as low as possible and a high capacity. At the initial stage of the drive of a vacuum pump, however, the use of such a stop valve makes the exhaust speed too fast, and a turbulent flow is likely to occur in the vacuum apparatus. This causes a problem that fine particles attached to the inner wall faces of a chamber or an exhaust pipe are apt to be scaled off and scattered.

As shown in FIG. 8, a typical vacuum apparatus which avoids this problem comprises a main valve a of a large capacity provided in an exhaust passageway c, an auxiliary valve b of a small capacity also provided in the exhaust passageway c and arranged in parallel with the main valve a in such a manner that only the auxiliary valve b is opened to make the exhaust speed low at the initial stage of air exhaust and the main valve is opened after the degree of vacuum has been enhanced to some extent.

However, this typical vacuum apparatus must be provided with two valves a and b arranged in parallel with each other. Thus, the apparatus is encountered with the problem that it is costly and requires a large space and the operation of the valves is cumbersome.

SUMMARY OF THE INVENTION

The object of this invention is to provide a stop valve for a vacuum apparatus, which is compact, readily attachable and easy to operate without generating particles.

The object is attained by providing a stop valve for a vacuum apparatus, which comprises a valve casing having an inlet port and an outlet port, a main valve means housed in the valve casing, for selectively opening and closing a flow passageway for causing the inlet port to communicate with the outlet port, an auxiliary valve means for selectively opening and closing an orifice formed in the main valve means and capable of opening the flow passageway by opening the orifice when the main valve means is closed, a valve shaft for driving the main valve means and the auxiliary valve means, and control means for controlling the operation of the valve shaft and opening the main valve means after the auxiliary valve means has been opened.

With the stop valve for a vacuum pump according to this invention, the auxiliary valve means can be opened to perform small air exhaust in the first step, and the main valve means can be opened to effect large air exhaust in the second step, such that the main valve means and the auxiliary valve means both housed in the valve casing are opened, in turn, by means of a single valve shaft for operating both the valve means. As a result, the stop valve is reduced in size, readily attachable and easily operated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 6A and 6B are exploded perspective views of piston control means of the stop valve;

FIG. 7 is a side view of the control means; and

DETAILED DESCRIPTION OF THE PREFERRED EMBODIMENTS

This invention will now be explained by way of preferred embodiments with reference to the accompanying drawings.

Figure 1:
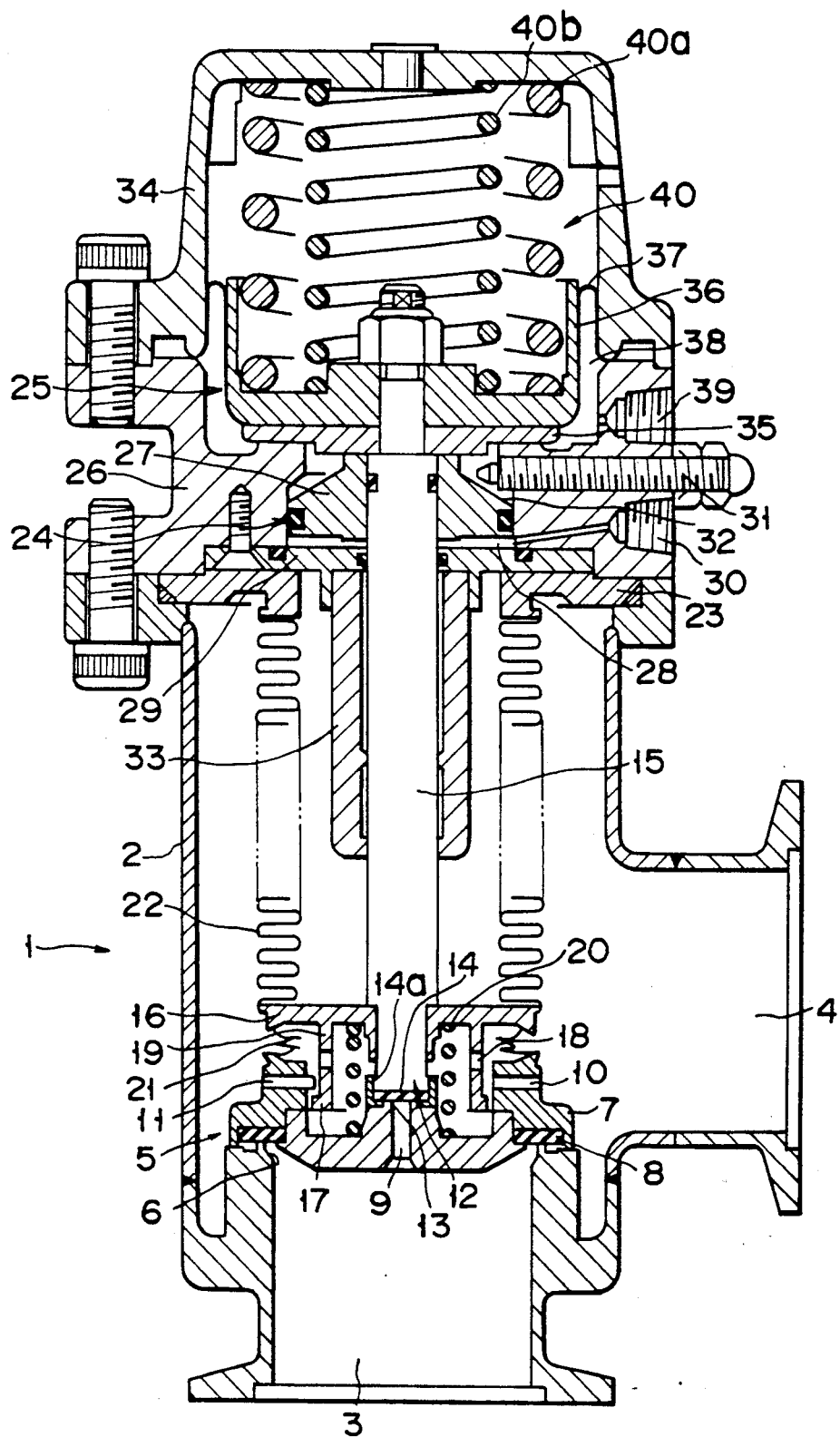
FIG. 1 is a longitudinal cross-sectional view of a stop valve for a vacuum apparatus according to the first embodiment of this invention.
Figure 2:
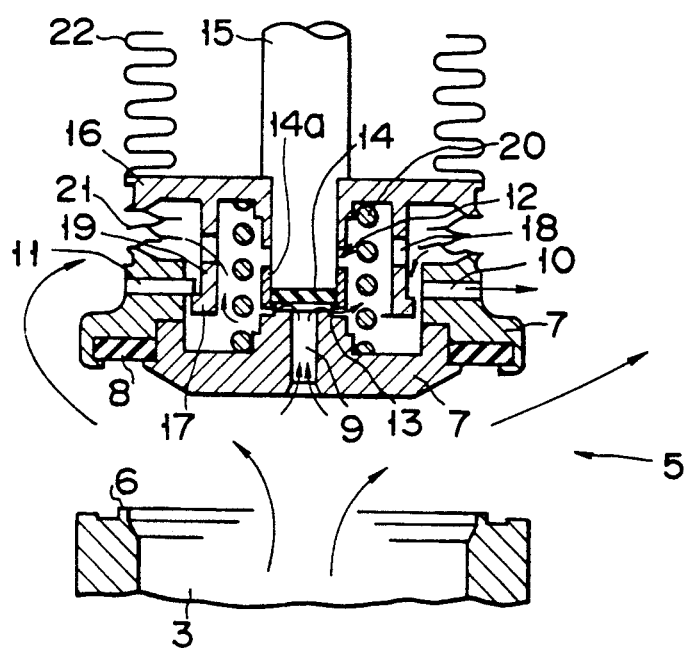
FIG. 2 is a cross-sectional view of a main valve element and an auxiliary valve element of the apparatus shown in FIG. 1, with the main valve element opened.

In FIGS. 1 and 2 is shown a stop valve for a vacuum apparatus according to the first embodiment of this invention. The stop valve has a valve casing 1 comprising a tubular main body 2, and an inlet port 3 and an outlet port 4 both connected to the tubular main body 2.

A main valve portion 5 provided in the valve casing 1 has a main valve seat 6 formed in the inner end portion of the inlet port 3 and a main valve body 7 facing the main valve seat 6 so as to open the inlet port 3. The main valve body 7 holds a valve member 8 which is selectively engaged with and disengaged from the main valve seat 6.

As shown in FIG. 2, a small hole (an orifice) 9 penetrates through the central portion of the main valve body 7, and a communication hole 10 extends radially through the lateral wall of the main valve body 7. A projection 11 such as a pin projects inwardly from the lateral wall of the main valve body 7.

An auxiliary valve portion 12 is provided with an auxiliary valve seat 13 formed on the inner edge portion of the small hole (orifice) 9, and an auxiliary valve body 14 selectively engaged with and disengaged from the auxiliary valve seat 13 for selectively opening and closing the small hole 9. The auxiliary valve body 14 is connected to the lower end of a valve shaft 15 by means of a holder 14a.

To the lower portion of the valve shaft 15 is fixed a connecting member 16 which is provided with an engaging portion 17 and a tubular portion 19 having a radial through hole 18. The engaging portion 17 cooperates with the projection 11 for preventing the connecting member 16 from moving by a distance more than a predetermined stroke defined between the projection 11 and the main valve body 7. Between the main valve body 7 and the connecting member 16 are disposed a first spring 20 which is placed in the tubular portion 19, and first metal bellows 21 which are located externally of the tubular member 19.

As shown in FIG. 1, second bellows 22 have the lower end connected to the connecting member 16 and the upper end fixed to a flange portion 23 which closes the open end of the tubular main body 2 and is sealed by means of an O-ring. The upper portion of the valve shaft 15 extends through the flange portion 23 so as to reciprocate the portion 23 axially.

At the upper end of the tubular main body 2 are provided a first drive unit 24 for driving the auxiliary valve body 14 through the valve shaft 15, and a second drive unit 25 for driving the main valve body 7 through the valve shaft 15.

The first drive unit 24 comprises a cylinder 26 connected to the tubular main body 2, a piston 27 housed in the cylinder 26 and permitting the valve shaft 15 to penetrate axially slidably therethrough, and a partition wall 29 fixed to the cylinder 26. The valve shaft 15 extends through the partition wall 29, and a first pressure chamber 28 is formed between the piston 27 and the partition wall 29. Further, the first drive unit 24 is provided with a first air supply hole 30 for introducing compressed air into the first pressure chamber 28 and an adjusting screw 31 for variably setting the displacement of the piston 27. The inclined surface 32 of the piston 27 abuts against the inner end of the adjusting screw 31 such that the axial displacement of the piston 27 is prevented. The partition wall 29 is provided with a guide tube 33 in which the valve shaft 15 is inserted.

The second drive unit 25 comprises a spring case 34 connected to the tubular main body 2 by means of the cylinder 26, a diaphragm 37 held at its outer edge portion by means of the cylindrical portion 26 and the spring case 34 and supported at its central portion on the valve shaft 15 by means of a supporting member 35 and a spring receiving portion 36, and a second air supply hole 39 formed in the cylinder 26. Compressed air can be introduced from the second air supply hole 39 into a second pressure chamber 38 defined by the supporting member 35, the diaphragm 37 and the cylinder portion 26. Further, the second drive member 25 is provided with a second spring 40 comprising a pair of spring elements 40a and 40b disposed between the spring case 34 and the spring receiving member 36.

The operation of the stop valve according to a first embodiment will now be explained.

The stop valve constructed as mentioned above is used after the inlet port 3 and the outlet port 4 have been connected to a vacuum apparatus and a vacuum pump (neither shown), respectively. When neither the vacuum pump is driven nor the valve is used, the main valve body 7 and the auxiliary valve body 14 are pressed against the main valve seat 6 and the auxiliary valve seat 13 by means of the restoring forces of the first spring 20 and the second spring 40, respectively. Both the main valve portion 5 and the auxiliary valve portion 12 are in a closed state, and the communication between the inlet port 3 and the outlet port 4 is interrupted.

When compressed air is conducted from the first air supply hole 30 into the first pressure chamber 28 while the vacuum pump is being operated, the piston 27 is lifted and abuts against the supporting member 35 such that the piston 27 moves the supporting member 35 and the spring receiving member 36 in the compressing direction of the second spring 40. As a result, the valve shaft 15 is lifted and the auxiliary valve body 14 of the auxiliary valve portion 12 is moved away from the auxiliary valve seat 13. When the inclined surface 32 of the piston 27 abuts against the corresponding adjusting screw 31, the auxiliary valve portion 12 is fully opened. In this case, the supporting member 35 and the spring receiving member 36 are lifted together with the valve shaft 15 with the result that the diaphragm 37 is displaced and the second spring 40 is compressed. As the connecting member 16 is lifted further together with the valve shaft 15, the first spring 20 is somewhat extended. Since, however, the first spring 20 has such a sufficient restoring force that it presses the main valve body 7 against the main valve seat 6, whereby the main valve portion 5 retains a closed state. Accordingly, air is exhausted from the inlet port 3 to the outlet port 4 through the small hole 9, the auxiliary valve portion 12, the through hole 18 and the communication hole 10.

As compressed air is introduced from the second air supply hole 39 into the second pressure chamber 38 when the degree of vacuum in the vacuum apparatus reaches a required level, the supporting member 35 and the spring receiving member 36 are moved by a thrust exerted by the diaphragm 37 in the compressing direction of the second spring 40, and at the same time, the valve shaft 15 and the connecting member 16 are moved in the same direction. The main valve body 7 is lifted by means of the connecting member 16 when the projection 11 engages the engaging portion 17, and the main valve body 7 is moved away from the main valve seat 6. Consequently, the main valve portion 5 is opened, and the degree of the opening of the main valve portion 5 is set to the required level in accordance with the pressure of the compressed air. In this state, substantially direct air exhaust is carried out from the inlet port 3 to the outlet port 4.

In the stop valve constructed as explained above, the main valve body 7 of the main valve portion S and the auxiliary valve body 14 of the auxiliary valve portion 12 are connected to the common valve shaft 15, and the valve shaft 15 is operated in two steps such that the valve shaft 15 drives the first drive unit 24 in a narrow range and then the second drive unit 25 in a wide range. Thus, the main valve portion 5 and the auxiliary valve portion 12 are assembled in a single valve casing 1 having the inlet port 3 and the outlet port 4. Further, the stop valve can be rendered compact, and the degree of the opening of the valve can be rendered sufficiently small. Therefore, the flow speed can be limited at the beginning of the operation of the stop valve, and fine particles can be effectively prevented from being scaled off or scattered in the vacuum apparatus.

A modification of each of the main valve and the auxiliary valve will now be explained.

Figure 3:
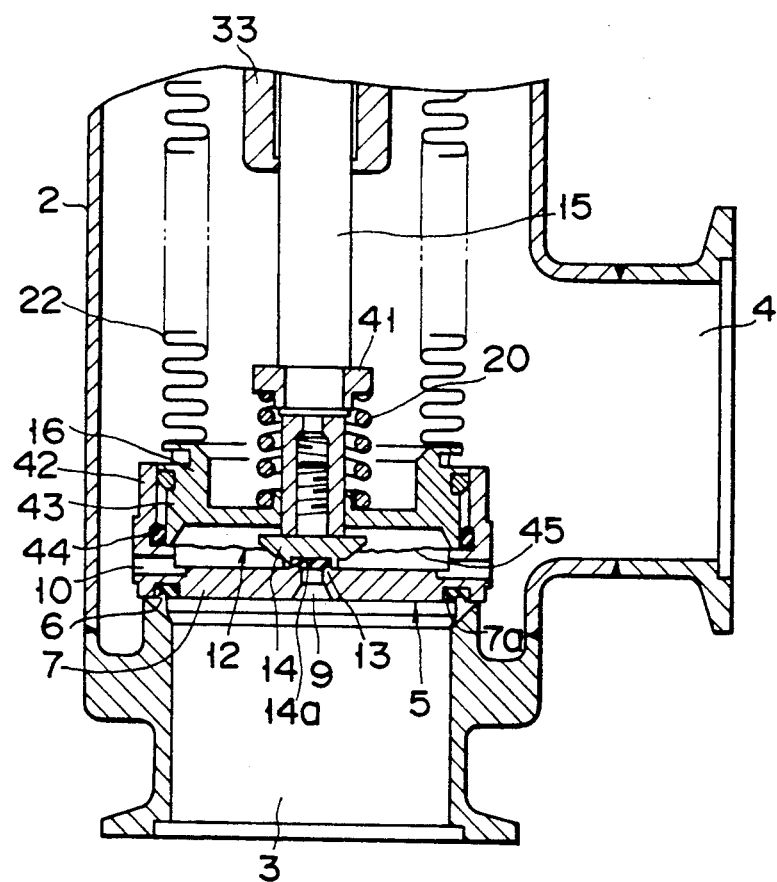
FIGS. 3 and 4 are cross-sectional views of modifications of the main valve element and the auxiliary valve element of the stop valve according to this invention.
Figure 4:
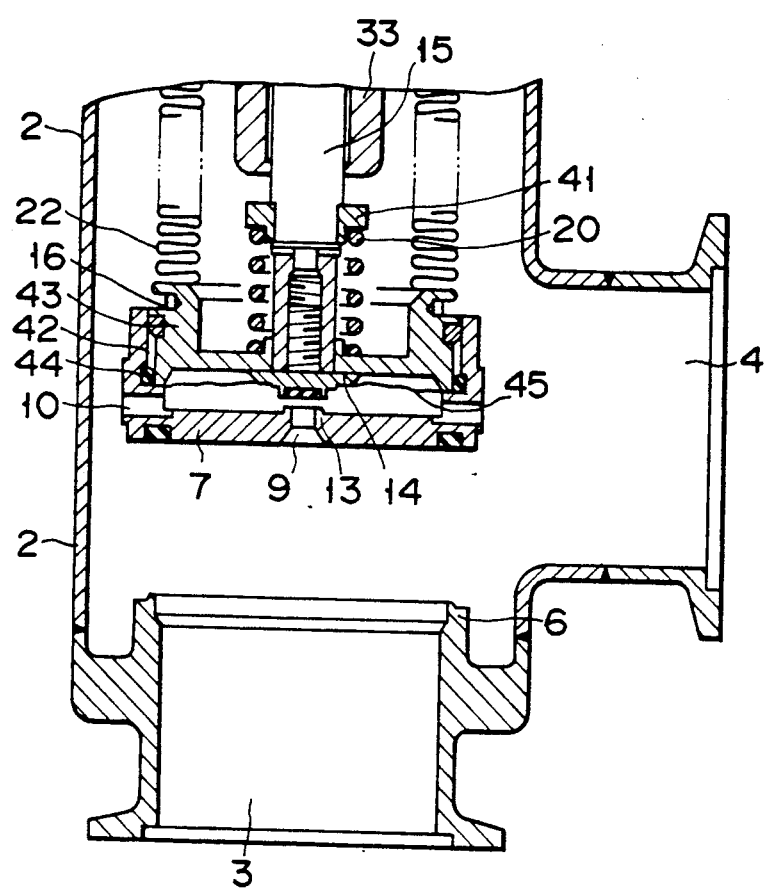

In FIGS. 3 and 4 are shown the main portions of the main valve portion 5 and the auxiliary valve portion 12. To the lower end portion of a valve shaft 15 is slidably connected a connecting member 16 which is urged downward by means of a first spring 20 disposed between the connecting member 16 and a spring receiving member 41 provided on the valve shaft 15.

The lateral wall 42 of a main valve body 7 and the lateral wall 43 of the connecting member 16 are threadably engaged with each other and are hermetically sealed by an O-ring 44. A communication hole 10 is formed in the lateral wall 42 of the main valve body 7.

The valve shaft 15, the sliding portion of the connecting member 16 and the first spring 20 are provided in the second bellows 22. A metal diaphragm 45 is disposed in the auxiliary valve body 14 of the auxiliary valve portion 12 and has an outer edge sandwiched by the lateral wall 42 of the valve body 7 and the lateral wall 43 of the connecting member 16. A ling-shaped valve piece 7a is attached to the main valve body 7 by vulcanization, and a disc-shaped valve piece 14a is attached to the auxiliary valve body 14 by the same attaching method.

As shown in a closed state in FIG. 3 and in an open state in FIG. 4, this stop valve having the modified main and auxiliary valve elements is operated in the same manner as the first embodiment. Since the valve shaft 15, the sliding portion of the connecting member 16 and the first spring 20 are disposed in the second bellows 22 and the auxiliary valve body 14 of the auxiliary valve portion 12 is covered with the metal diaphragm 45, the sliding portion and the first spring 20 are not exposed to fluid.

This prevents particles, scaled off or falling from the sliding portion and the first spring 20, from being mixed with the fluid.

The second embodiment of this invention will now be explained with reference to FIGS. 5 to 7.

Figure 5:
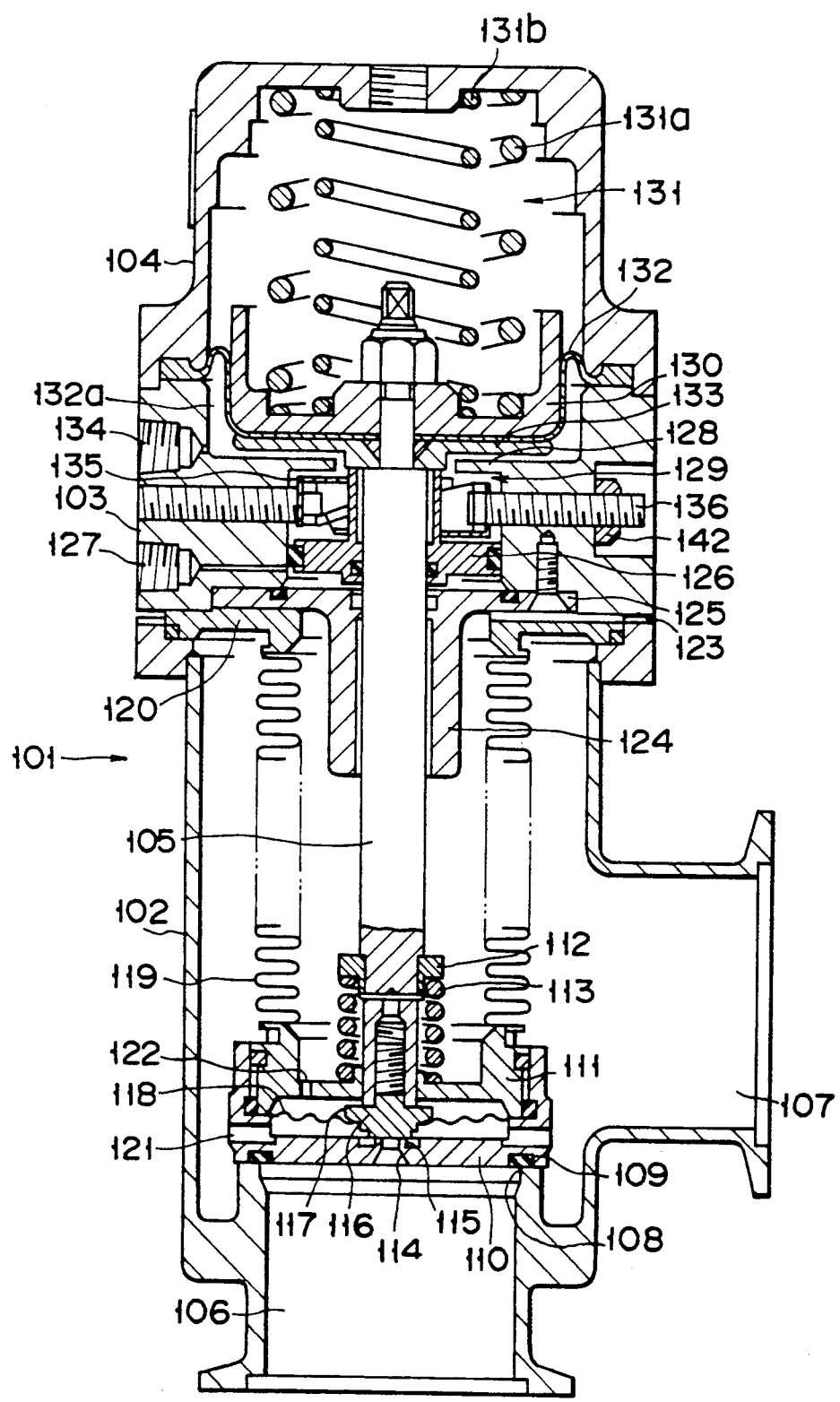
FIG. 5 is a longitudinal cross-sectional view of a stop valve for a vacuum apparatus according to the second embodiment of this invention.
Figure 8:
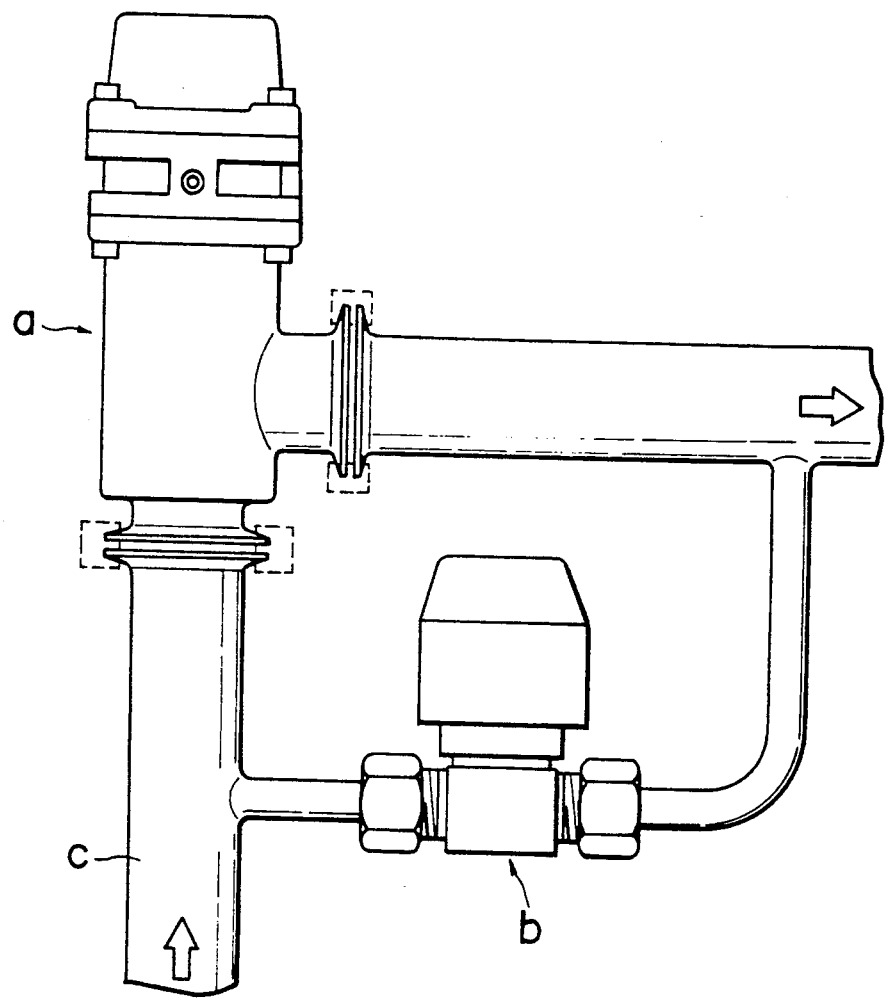
FIG. 8 is a side view of a conventional stop valve for a vacuum apparatus.

In FIG. 5, a valve casing 101 contains a main body 102, a tubular portion 103 and a cover 104 arranged axially of the valve casing 101 in this order, and an axially reciprocating valve shaft 105.

In the main body 102 are formed an inlet port 106, an outlet port 107 and a main valve hole 108 of a large diameter disposed between both the ports. A main valve seat 109 is formed on an edge portion of the main valve hole 108. A main valve body 110 constituting a main valve element, together with the main valve seat 109, is supported via a supporting member 111 on the valve shaft 105 so as to be movable in the axial directions. The main valve body 110 is normally urged in the closed direction by means of a first spring 113 disposed between a spring seat 112 mounted on the valve shaft 105 and the supporting member 111. The main valve body 110 faces the main valve seat 109 so a to be selectively engaged with and disengaged from the main valve seat 109.

An auxiliary valve hole (orifice) 114 having a small diameter is formed in the main valve body 110, and an auxiliary valve seat 115 is formed on an edge portion of the auxiliary valve hole 114. To the lower end of the valve shaft 105 is fixed an auxiliary valve body 116 constituting an auxiliary valve body, together with the auxiliary valve body 116. The auxiliary valve body 116 is provided with an engaging portion 117 which has a larger diameter than the valve shaft 105 and selectively abuts against and is moved away from the supporting member 111. To the auxiliary valve body 116 is fixed the central portion of a diaphragm 118 whose outer edge portion is sandwiched between the main valve body 110 and the supporting member 111. Bellows 119 have a lower end connected to a supporting member 111 and an upper end fixed to a flange portion 120 disposed between the main body 102 and the tubular portion 103.

In the main valve body 110 is formed a communication hole 121 for causing the input port 106 to communicate with the output port 107 when the auxiliary valve hole 114 is in an open state. An axially extending through hole 122 is formed in the supporting member 111. Defined between the flange portion 120, the main body 102 and the tubular portion 103 is a communication passageway 123 for causing the interior of the bellows 119 to communicate with the outer atmosphere.

The flange portion 125 of a guide tube 124 is fixed to the lower end of the tubular portion 103. The valve shaft 105 passes through the guide tube 124 and extends in the cover 104. The tubular portion 103 has a compressed air hole 127 which opens at the side of the flange portion 125. The tubular portion 103 and a piston 126 frictionally engaged with the valve shaft 105 in the tubular portion 103 constitute an auxiliary-valve element drive unit. Between the upper wall portion 128 of the tubular portion 103 and a piston 126 is provided control means (a control mechanism) 129 for controlling and setting the displacement of the piston 126 in its opening direction so as to adjust the degree of opening of the auxiliary valve element, as will be described later.

In the cap 104, a spring seat 130 is fixed to the upper end of the valve shaft 105. A second spring 131 comprising spring elements 131a and 131b is disposed between the spring seat 130 and the cap 104. A diaphragm 132 is sandwiched at its outer edge between the tubular portion 103 and the cap 104 and at its central portion between the spring seat 130 and a holding plate 133. The second spring 131 and the diaphragm 132 constitute a main-valve element driving unit. The operation space 132a of the main-valve element driving unit is formed in the tubular portion 103 so as to communicate with a compressed air hole 134 formed in the tubular portion 103.

The control means 129 includes a pair of wedge-shaped cams 135 arranged axially of the tubular portion 103 so as to overlap with each other and disposed between the upper wall portion 128 of the tubular portion 103 and the piston 126, and adjusting screws 136 engaged with screw holes formed in the tubular portion 103.

As shown in FIGS. 6A and 6B, each wedge-shaped cam 135 has a right-angled triangular cross section and possesses an inclined surface 127 slidable on the inclined surface of the other wedge-like cam 135. Further, the cam 135 is placed so as not to interfere with the valve shaft 105. An axially elongated elliptical through hole 139 is formed in the lateral wall 138 of the cam 135. The adjusting screw 136 is connected by means of washers 140 and E rings 141 to the lateral wall 138 of the cam 135 with the inner end portion of the adjusting screw 136 inserted in the through hole 139 such that both the adjusting screws 136 cooperate to be adjusted in the diametrical directions of the valve shaft 105 and they are relatively displaceable from each other in the axial directions of the valve shaft 105.

With this structure the rotation of the adjusting screws 136 causes the cams 135 to move in parallel with each other in the diametrical directions of the valve shaft 105 such that the overlapping thickness t is adjusted according to the amount of relative displacement between both the cams, as shown in FIG. 7. Both the cams 135 are arranged and the inclined angle of each inclined surface 137 is selected such that, when one of the cams 135 is set to the outermost position in the tubular portion 103, all required overlapping thicknesses t are obtained by moving the other cam 135 by means of the corresponding adjusting screw 135. It is, therefore, preferable that one of the cams 135, which is difficult to operate after it has been installed, is set to the outermost position in advance. As shown in FIG. 5, a lock nut 142 is fitted onto one of the adjusting screw 136, at the outer side of the tubular portion 103.

The operation of the stop valve according to the second embodiment will now be described.

The inlet port 106 and the outlet port 107 have been connected to a vacuum chamber and a vacuum pump (neither shown), respectively, and the control means 129 has been adjusted by means of the adjusting screws 136 such that the exhaust capacity, that is, the overlapping thickness t of the cams 135 has been set to the required value in accordance with the capacity of the vacuum chamber.

When the vacuum pump is not being used, the main valve body 110 and the auxiliary valve body 116 are pressed against the main valve seat 109 and the auxiliary valve seat 115 by the restoring forces of the first spring 113 and the second spring 131, respectively, such that the main valve hole 108 and the auxiliary valve hole 114 are closed and the inlet port 106 and the outlet port 107 are interrupted from each other.

In an operating state of the vacuum pump, the supply of compressed air from the compressed air hole 127 of the auxiliary-valve element driving unit in the stop valve causes the piston 126 and the valve shaft 105 to be moved in the compressing direction of the second spring 131. The auxiliary valve body 116 is moved away from the auxiliary valve seat 115 such that the auxiliary valve hole 114 is opened. When the piston 126 is moved until it abuts against the cam 135, the auxiliary valve hole 114 or the auxiliary valve element is opened to the required degree. In this case, the first spring 113 is somewhat extended. However, the main valve hole 108 remains closed because the first spring 113 has a sufficient restoring force to press the main valve body 110 against the main valve seat 109. In this state, air exhaust at a low speed is effected from the inlet port 106 to the outlet port 107 through the auxiliary valve hole 114 and the communication hole 121.

Upon supplying compressed air from the compressed air hole 134 of the main-valve element driving unit when the degree of vacuum in the vacuum chamber reaches the required level, the holding plate 133 and the spring seat 130 are moved in the compressing direction of the second spring 131 by a thrust exerted by the diaphragm 132, and at the same time, the valve shaft 105 is also moved in the same direction. When the engaging portion 117 provided on the auxiliary valve body 116 abuts against the supporting member 111, the main valve body 110 cooperates with the valve shaft 105 to be moved away from the main valve seat 109, and the degree of the opening of the main valve hole 108 is set to the required level according to the pressure of the compressed air. In this state, the valve hole 108 and the auxiliary valve hole 114 are both opened, and air exhaust at a high speed is carried out.

Since the main valve body 110 can be operated in a wide range and the auxiliary valve body 116 can be driven in a narrow range in the stop valve by means of the valve shaft 105 in the second embodiment, the main and auxiliary valve elements are assembled in a parallel manner in a single valve box 101 having the inlet port 106 and the outlet port 107. This renders the stop valve compact and allows the same to be operated very easily. Because the degree of the opening of the auxiliary valve element can be made sufficiently small, the air flow speed at the initial stage of the operation of the auxiliary valve element can be limited, and fine articles in the vacuum apparatus can effectively be protected from being scale off or scattered.

Further, because the control means 129 is provided with the two axially overlapping wedge-shaped cams 135 and the adjusting screws 136 for adjusting the overlapping thickness t of the cams 135, the piston 126 is operated smoothly without being inclined, when the piston 126 is pressed by the cams 135. The overlapping thickness t can be set by either one of the adjusting screws 136. Thus, the adjustment of the wedge-shaped cams is readily performed and accurately made specifically on a narrow operating site.

This invention is not limited to the above-mentioned embodiments and modifications. Needless to say, the invention is applicable to various modifications as long as they are not departed from the scope of this invention.

What is claimed is:

1. A stop valve for a vacuum apparatus, comprising:
   a valve casing having an inlet port and an outlet port;
   a main valve means housed in said valve casing, for selectively opening and closing a flow passageway which causes said inlet port to communicate with said outlet port;
   an auxiliary valve means for selectively opening and closing an orifice formed in said main valve means and capable of opening said flow passageway by opening said orifice when said main valve means is closed;
   a valve shaft for driving said main valve means and said auxiliary valve means;
   control means for controlling operation of said valve shaft and opening said main valve means after said auxiliary valve means has been opened;
   guide means for selectively engaging said auxiliary valve means with and disengaging said auxiliary valve means from said main valve means;
   a first spring for urging said main valve means and said auxiliary valve means to be moved away from each other; and
   a metal diaphragm for isolating said guide means and said first spring from a fluid flowing said flow passageway.

2. The apparatus according to claim 1, further comprising:
   a main valve seat provided adjacent to said inlet port, for selectively engaging with and disengaging from said main valve means; and
   an auxiliary valve seat provided in said main valve means, for selectively engaging with and disengaging from said auxiliary valve means.

3. The apparatus according to claim 1, wherein said valve shaft has an end portion connected to said auxiliary valve means and said guide means, and the other end portion connected to said control means.

4. The apparatus according to claim 1, wherein said control means has a first drive unit for driving said auxiliary valve means and a second drive unit for driving said main valve means.

5. The apparatus according to claim 1, wherein each of said main and auxiliary valve means has a valve body and a valve piece attached thereto by vulcanization.

6. The apparatus according to claim 1, wherein said guide means includes a projection, such as a pin, which projects inwardly from the lateral wall of said main valve means, and a connecting member fixed to the lower portion of said valve shaft.

7. A stop valve for a vacuum apparatus, comprising:

a valve casing having an inlet port and an outlet port;

a main valve means housed in said valve casing, for selectively opening and closing a flow passageway which causes said inlet port to communicate with said outlet port;

an auxiliary valve means for selectively opening and closing an orifice formed in said main valve means and capable of opening said flow passageway by opening said orifice when said main valve means is closed;

a valve shaft for driving said main valve means and said auxiliary valve means;

control means for controlling operation of said valve shaft and opening said main valve means after said auxiliary valve means has been opened, wherein said control means has a first drive unit for driving said auxiliary valve means and a second drive unit for driving said main valve means; wherein said second drive unit has a diaphragm connected to said valve shaft, for lifting said valve shaft under a pressure of compressed air and opening said main valve means and a second spring for pressing said diaphragm; and said first drive means comprises a piston slidably mounted on said valve shaft and disposed so as to abut against said diaphragm and lift said valve shaft under a pressure of compressed air, for opening said auxiliary valve means, and limiting means for limiting a lifting stroke of said piston.

8. The apparatus according to claim 7, wherein said limiting means comprises a pair of wedge-shaped cams arranged diametrically of said piston so as to face each other and overlapping with each other along said valve shaft, and adjusting means for adjusting an overlapping thickness of said cams.

* * * * *